United States Patent [19]
Kim et al.

[11] Patent Number: 5,715,486
[45] Date of Patent: Feb. 3, 1998

[54] CAMERA CAPABLE OF INTERFACING WITH INFORMATION INPUT AND DISPLAY DEVICES SO TO RECORD INFORMATION ON A MAGNETIC TRACK OF A FILM

[75] Inventors: Joo-Bok Kim; Byong-Wook Jin; Eun-Ju Song; Jung-Yun Han, all of Seoul, Rep. of Korea

[73] Assignee: Samsung Aerospace Industries, Ltd., Kyungsangnam-do, Rep. of Korea

[21] Appl. No.: 670,600

[22] Filed: Jun. 26, 1996

[30] Foreign Application Priority Data

Jun. 29, 1995 [KR] Rep. of Korea ............... 95-18276

[51] Int. Cl.$^6$ ............. G03B 17/02; G03B 17/18; G03B 17/24
[52] U.S. Cl. ............. 396/299; 396/300; 396/319; 396/535; 396/287
[58] Field of Search ............. 396/297, 299, 396/300, 310, 319, 281, 287, 439, 535, 536

[56] References Cited

U.S. PATENT DOCUMENTS

| | | | |
|---|---|---|---|
| 5,485,238 | 1/1996 | Miura et al. | 396/299 X |
| 5,500,701 | 3/1996 | Itoh | 396/319 |
| 5,543,885 | 8/1996 | Yamano et al. | 396/300 |
| 5,565,957 | 10/1996 | Goto | 396/300 X |
| 5,568,224 | 10/1996 | Saegusa | 396/300 |

*Primary Examiner*—David M. Gray
*Assistant Examiner*—J. K. Han
*Attorney, Agent, or Firm*—Finnegan, Henderson, Farabow, Garrett & Dunner, L.L.P.

[57] ABSTRACT

An advanced photo system (APS) camera includes a keyboard mounted on the inner surface of a rear cover hinged to the camera body. The camera also includes an LCD for displaying information entered on the keyboard, wherein the LCD is mounted at the rear of the camera body so as to be exposed when the rear cover is opened to provide user access to the keyboard. The information entered on the keyboard and displayed on the LCD is recorded on a magnetic track included on the photographic film advanced through the camera. The keyboard and the LCD may be separated from or remote from the APS camera, and the keyboard may be replaced with a plurality of input dials.

7 Claims, 10 Drawing Sheets

CAMERA CAPABLE OF INTERFACING WITH INFORMATION INPUT AND DISPLAY DEVICES SO TO RECORD INFORMATION ON A MAGNETIC TRACK OF A FILM

BACKGROUND OF THE INVENTION

A. Field of the Invention

The present invention generally relates to a camera for recording information onto a magnetic track of a film. More specifically, the present invention relates to a camera for recording information onto a magnetic track of a film, the camera being interfaced with or including an information input means for inputting the information into the camera.

B. Description of the Related Art

Multi-function cameras are being developed which can record information or sentences along with the photographed image onto the film. In conventional multi-function cameras, a device which records a few characters or numbers onto the film, such as the date of the photograph, is widely used. The recording device uses a separate frame on which the characters and/or numbers are recorded. The frame is exposed with the photographed image so that characters and/or numbers can be recorded on the photograph.

Recently, a useful and convenient information recording method has been developed, conventionally called an Advanced Photo System [hereinafter "APS"], which uses a film doped with a magnetic material. The conventional APS camera includes a magnetic head for recording the inputted information onto a film having a magnetic track on its surface. A pad of a recording section of the APS camera allows the magnetic track of the film to contact the magnetic head, so that the information on the magnetic head may be recorded onto the magnetic track.

SUMMARY OF THE INVENTION

The principle object of the present invention is to provide a variety of information input means for an APS camera capable of recording information onto a magnetic track of a film easily and conveniently.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

To achieve the objects and in accordance with the purpose of the invention, as embodied and broadly described herein, the invention comprises a camera for recording information on a magnetic track of a film. The camera comprises an information input means for inputting the information and for outputting signals representing the information. The camera further includes an information display means for displaying the information, and a control means for recording the information onto the magnetic track of the film.

In accordance with a second embodiment, the present invention includes a camera for recording information on a magnetic track of a film, which includes a plurality of information input means for inputting the information and for outputting signals representing the inputted information. The camera further comprises an information display means for displaying the information, and a control means for recording the information onto the magnetic track of the film.

In accordance with a third embodiment, the present invention includes a camera system for recording information on a magnetic track of a film in a camera, which comprises an input device having an information input means for inputting the information and for outputting signals representing the information, an information display means for displaying the information, and a means for transmitting the signals to the camera when the camera is coupled to the input device.

A fourth embodiment of the present invention includes a camera system having an input device which includes a information input means for inputting the information and for outputting signals representing the information, an information display means for displaying the information, and a remote signal transmission means for transmitting the signals to the camera.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several embodiments of the present invention and together with the description, serve to explain the principles of the invention. In the drawings.

DETAILED DESCRIPTION OF THE PREFERRED EMBODIMENTS

Reference will now be made in detail to the present preferred embodiments of the invention, examples of which are illustrated in the accompanying drawings. Wherever possible, the same reference numbers will be used throughout the drawings to refer to the same or like parts.

Figure 1:
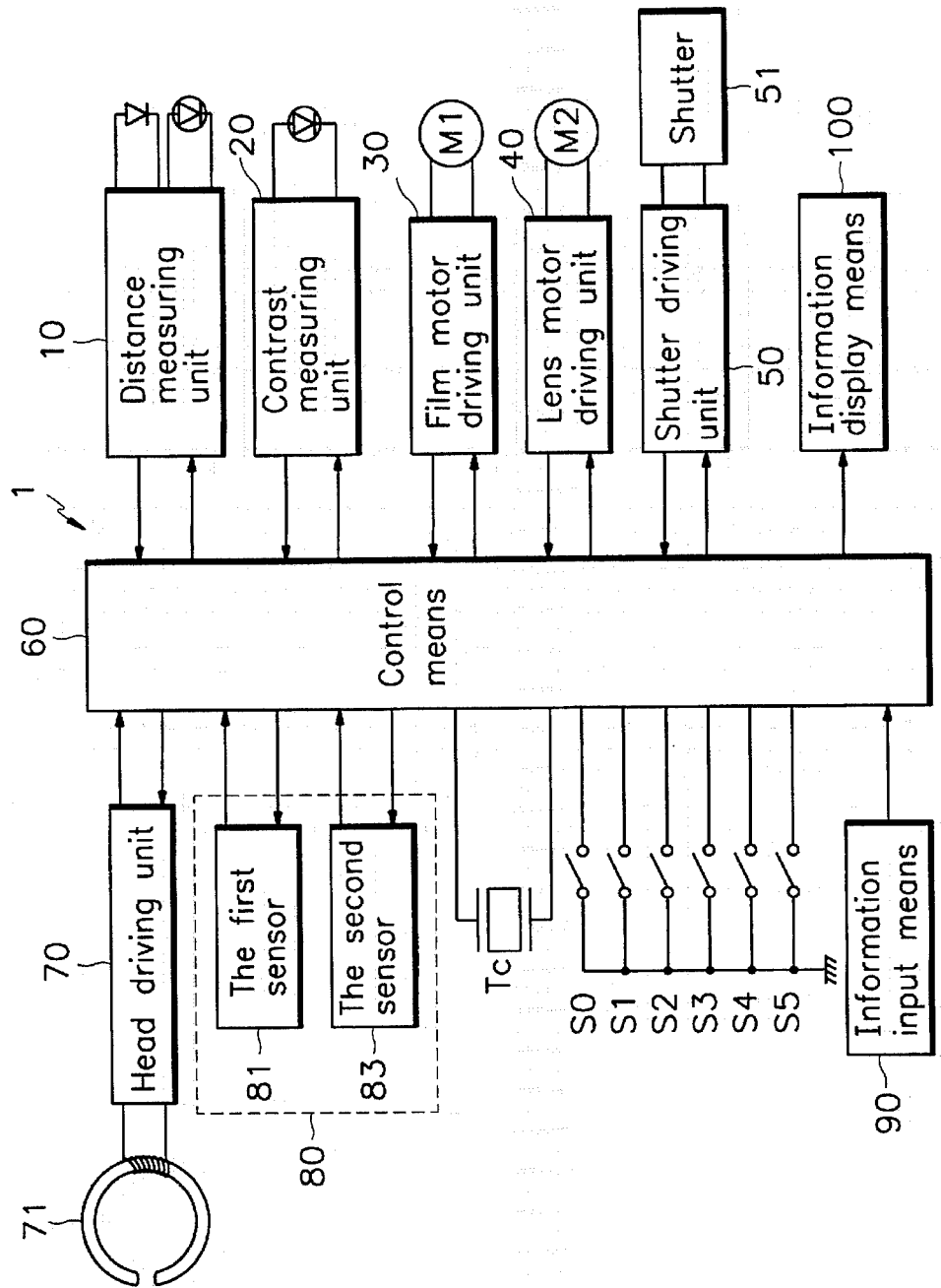
FIG. 1 is a functional block diagram of an APS camera according to a first embodiment of the present invention.

FIG. 1 shows an APS camera 1 for recording information on a magnetic track of a film according to the first embodiment of present invention. As shown in FIG. 1, the APS camera 1 includes a photographing switch S0, a power switch S1, a release switch S2, a rear cover switch S3, a pad detection switch S4, and a film detection switch S5, all being connected to a control means 60. The camera 1 further includes a distance measuring unit 10 for measuring the distance between an object and the camera 1, a contrast measuring unit 20 for measuring the contrast of the object, and a shutter driving unit 50 for controlling the speed of shutter 51 so to ensure a proper exposure according to the measured contrast. The distance measuring unit 10, contrast measuring unit 20, and shutter driving unit 50 are also connected to the control means 60.

The camera 1 further includes a film motor driving unit 30 and lens motor driving unit 40, each being connected to the control means 60, for controlling two motors M1, M2, respectively. Motors M1, M2 drive the film and the camera lens (not shown), respectively. The camera 1 also includes a magnetic head 71 for recording information on a magnetic track of a film (not shown). The contact between the magnetic head 71 and the film is controlled by a head driving unit 70 connected to the control means 60. The camera 1 further comprises a film position detection unit 80 having first and second sensors 81, 83 for measuring the revolution speed of the film motor M1 and for detecting the position of the film, respectively. Finally, the camera 1 includes an information input means 90 for inputting information to be recorded on the magnetic track of the film and for outputting signals according to the inputted information, and an information display means 100 for receiving the output signals from the control means 60 and for displaying the information. The control means 60 is a microprocessor-based controller which controls the receiving, displaying and recording of the information, as well as the overall operation of the camera 1.

In the first embodiment of the present invention, the information input means 90 is preferably a keyboard, and the information display means 100 is preferably a liquid crystal display device. However, it is to be distinctly understood that the information input means 90 and the information display means 100 may have different configurations.

Figure 2:
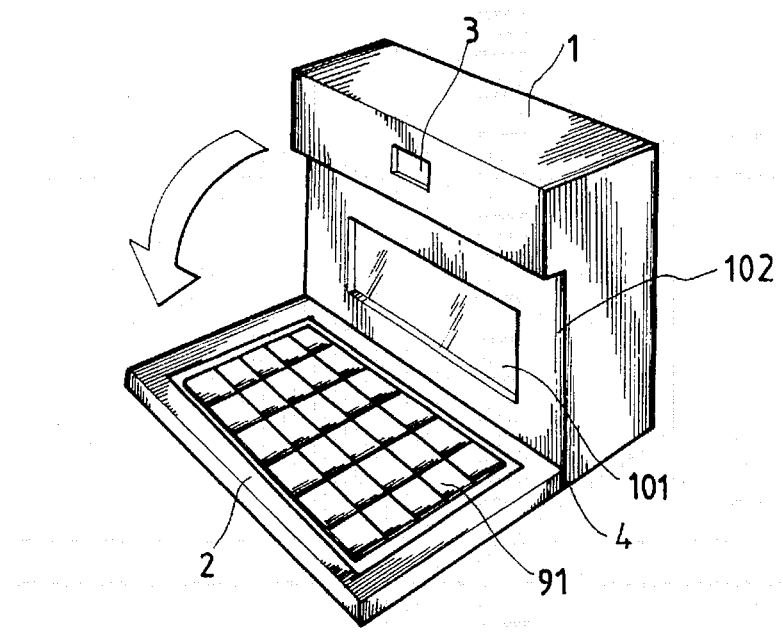
FIG. 2 is a perspective view of the APS camera according to the first embodiment of the present invention.

As shown in FIG. 2 and according to a first example of the first embodiment of present invention, the camera 1 includes a rear cover 2 which is hingedly attached to a bottom edge 4 of the camera 1. A keyboard 91, which is the information input means 90 in this first example, is mounted on the inner surface of the rear cover 2 of the camera 1. A liquid crystal display device 101, which is the information display means 100 in this first example, is formed on a rear surface 102 of the camera 1. Thus, when the rear cover 2 of the camera 1 is opened, information can be inputted with the keyboard 91 and can be viewed on the liquid crystal display device 101. A film cartridge (not shown) can be changed through an opening (not shown) which may be formed on the left side of the camera 1.

Figure 3:
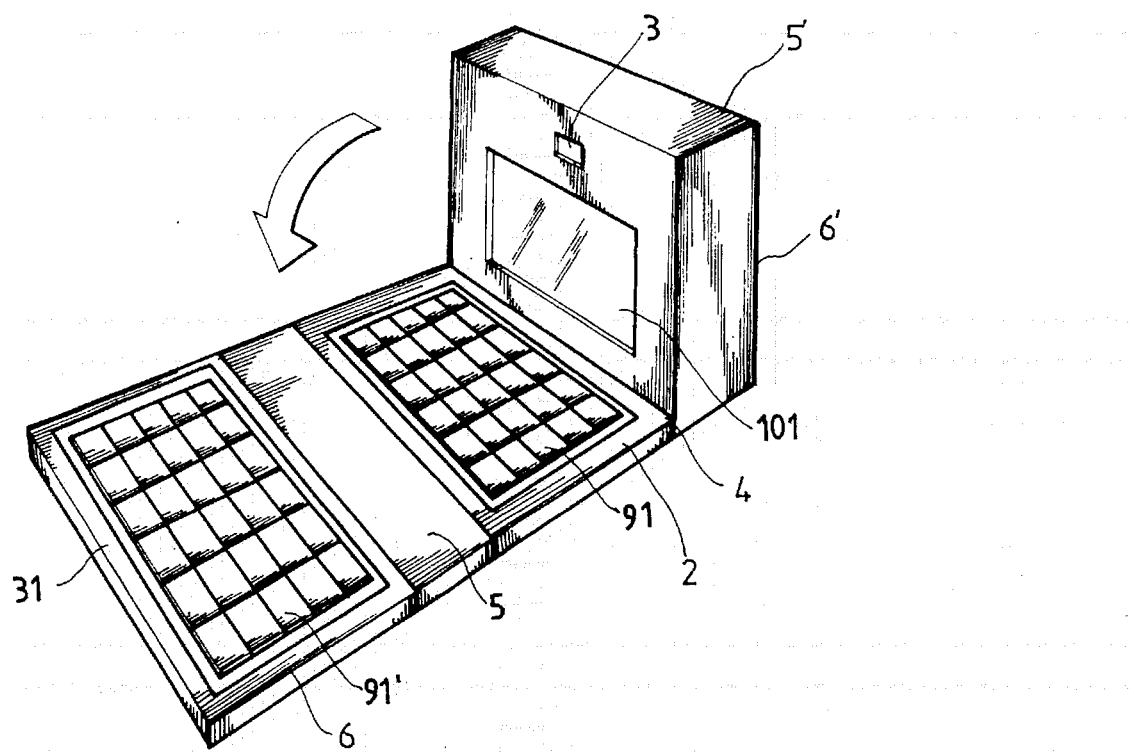
FIG. 3 is a perspective view of another APS camera according to the first embodiment of the present invention.

According to a second example of the first embodiment of present invention, as shown in FIG. 3, the camera 1 comprises a cover 31 having a rear cover 2, an upper cover 5 and a front cover 6. The rear cover 2 is hingedly attached to a bottom edge 4 of the camera 1, the upper cover 5 is hingedly attached to the rear cover 2 for covering an upper surface 5' of the camera 1, and the front cover 6 is hingedly attached to the upper cover 5 for covering a front surface 6' of the camera 1. The camera 1 of the second example, as shown in FIG. 3, further includes first and second information input means 91, 91', which are preferably keyboards, mounted on the inner surfaces of the rear cover 2 and the front cover 6, respectively. When the cover 31 of the camera 1 is opened, the information is inputted with the keyboards 91, 91' and is viewed on the liquid crystal display device 101, and the object to be photographed may be aligned via a view finder 3. The main advantage of the second example of the first embodiment is that it enables the mounting of an additional information input means on the camera 1.

Figure 4:
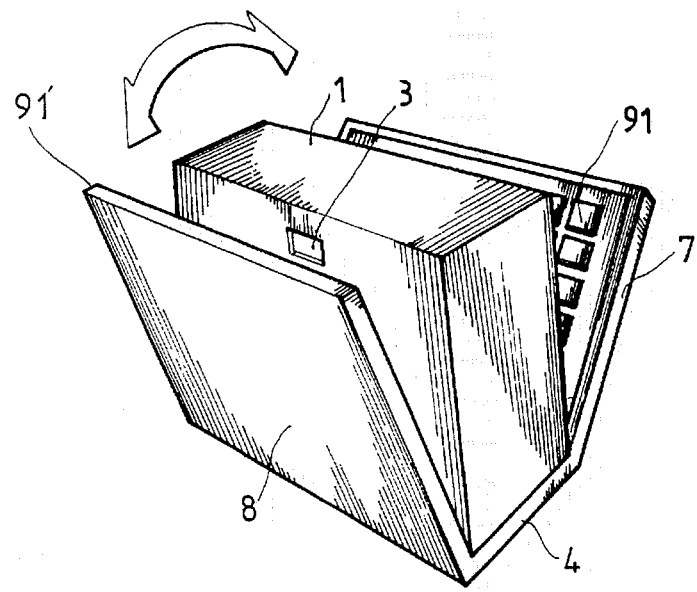
FIG. 4 is a perspective view of still another APS camera according to the first embodiment of the present invention.

In a third example of the first embodiment of present invention, as shown in FIG. 4, the camera 1 includes a rear cover 8 which is hingedly attached to a bottom edge 4 thereof. The camera 1 of the third example further includes a front cover 7, which is also hingedly attached to the bottom edge 4 of the camera 1, and first and second information input means 91, 91' which are mounted on the inner surfaces of the front 7 and rear 8 cover, respectively. The covers 7 and 8 may be made from polyvinyl chloride. When the covers 7, 8 of the camera 1 are opened, the information may be inputted with the first and second information input means 91, 91', the object to be photographed can be aligned via the view finder 3, and a film cartridge can be changed through an opening (not shown) which may formed in the left side of the camera 1.

Figure 5:
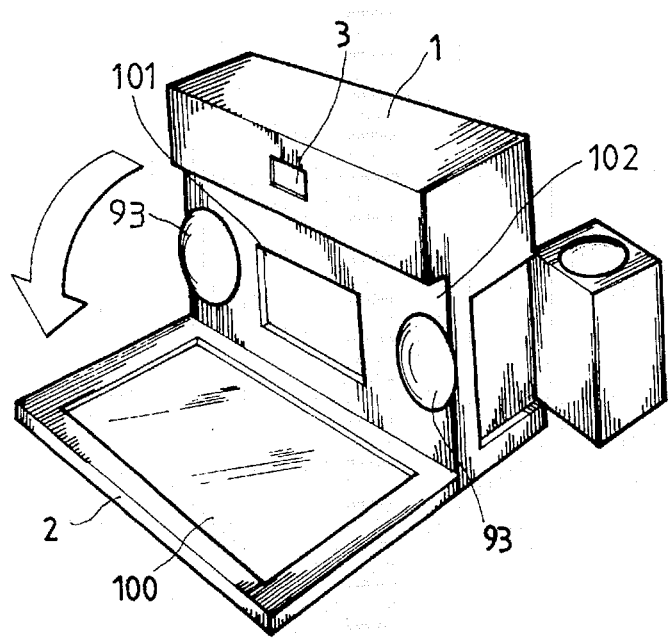
FIG. 5 is a perspective view of an APS camera according to a second embodiment of the present invention.

The second embodiment of the present invention will be described with reference to FIG. 5. As shown in FIG. 5, two dials 93, which are the information input means 90 in this embodiment, are mounted on a rear surface 102 of the camera 1. The dials 93 may be rotated so that the desired information to be inputted may be recorded on the film. In this embodiment, the information display means 100 is preferably formed on an inner surface of the rear cover 2 of the camera 1 for displaying information inputted by the dials 93. The processes of displaying, transmitting and recording the inputted information are the same as described above for the first embodiment, and are similarly controlled by the control means 60.

The third embodiment of present invention will be described with reference to FIGS. 6–9. As shown in the functional block diagram of FIG. 6, the camera 1 comprises a photographing switch S0, a power switch S1, a release switch S2, a rear cover switch S3, a pad detection switch S4, and a film detection switch S5 all connected to the control means 60. The camera 1 further includes a distance measuring unit 10 for measuring the distance between the object and the camera 1, a contrast measuring unit 20 for measuring the contrast of the object, and a shutter driving unit 50 for controlling the speed of shutter 51 so to ensure proper exposure according to the measured contrast. The distance measuring unit 10, contrast measuring unit 20, and shutter driving unit 50 are also connected to the control means 60.

The camera 1 of the third embodiment further includes a film motor driving unit 30 and a lens motor driving unit 40 for controlling two motor M1, M2, respectively. Motors M1, M2 drive the film (not shown) and the camera lens (not shown), respectively. The camera 1 also includes a magnetic head 71 for recording the inputted information on a magnetic track (not shown) of the film. The contact between the magnetic head 71 and the film is controlled by a head driving unit 70 connected to the control means 60. The camera 1 also includes a film position detection unit 80 having first and second sensors 81, 83 for measuring the revolution speed of the film motor M1 and for detecting the position of the film, respectively. An information input device 110 comprising an information input means 115 and an information display means 113 is also provided and is separate from the camera 1 in this embodiment. Finally, the camera 1 includes a contacting means 120 for transmitting the signals to the camera 1 by connecting to input means 115 to the camera 1.

Figure 6:
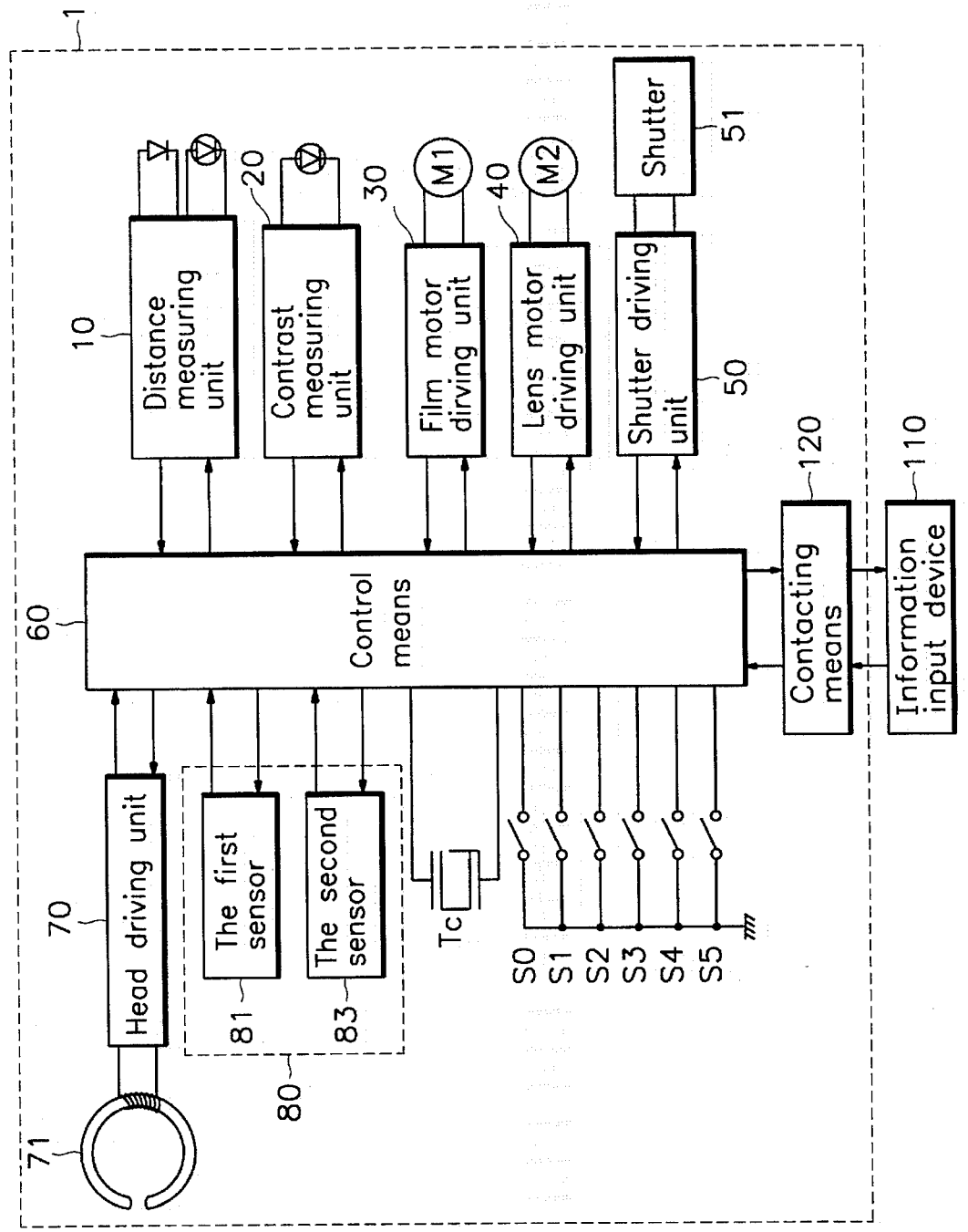
FIG. 6 is a functional block diagram of an APS camera according to the third embodiment of the present invention.
Figure 7:
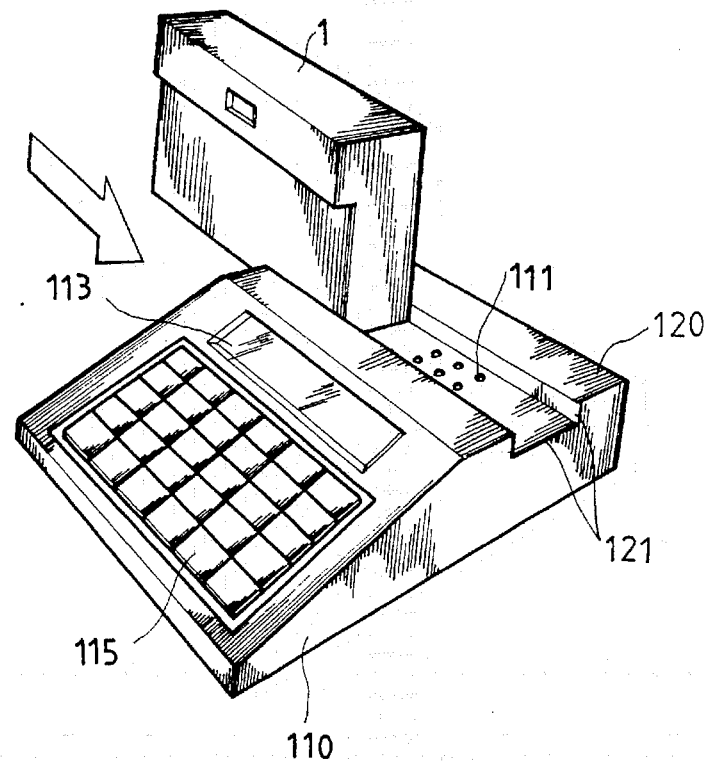
FIG. 7 is a perspective view of the APS camera according to the third embodiment of the present invention.

Similar to the first embodiment, the control means 60 of the third embodiment is a microprocessor-based controller which controls the receiving, displaying and recording of the information, and the operation of the camera 1. As shown in FIGS. 6 and 7, the information input device 110 is separate from the body of camera 1 and transmits a signal according to the inputted information to the control means 60 located within the body of the camera 1 via a plurality of signal transmission terminals 111.

The first example of the third embodiment of the present invention is shown in FIG. 7. In this example, the information input means 115 and the information display means 113 are separate from the body of camera 1, and are preferably a keyboard 115 and a liquid crystal display device 113, respectively. As further shown in FIG. 7, the contacting means 120 includes a guide rail 121 formed on an upper surface of the information input device 110 which enables the body of camera 1 to be fastened thereto, and a plurality of signal transmission terminals 111 for transmitting the signal from the information input device 110 to the control means 60. In this example of the third embodiment, the camera 1 may be connected to the information input device 110 so that the information to be recorded on the film may be inputted.

Figure 8:
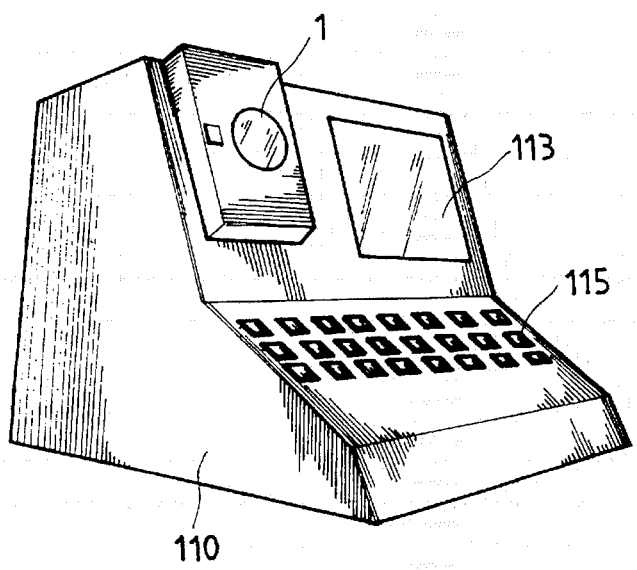
FIG. 8 is a perspective view of another APS camera according to the third embodiment of the present invention.
Figure 9:
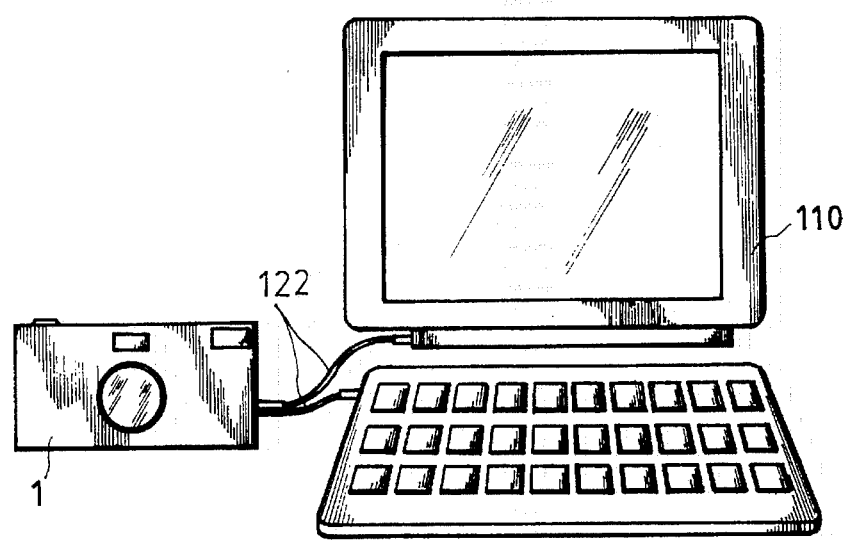
FIG. 9 is a perspective view of still another APS camera according to the third embodiment of the present invention.
Figure 11:
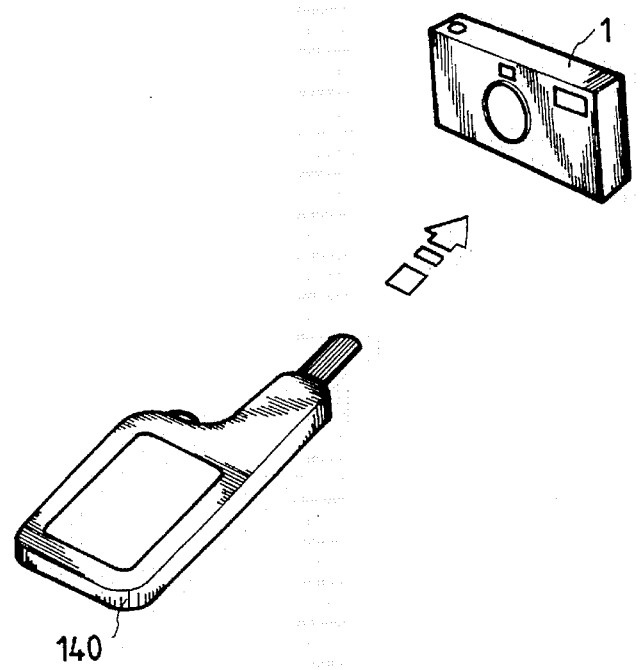
FIG. 11 shows a transmission of signals between a remote control and the APS camera according to the fourth embodiment of the present invention.
Figure 10:
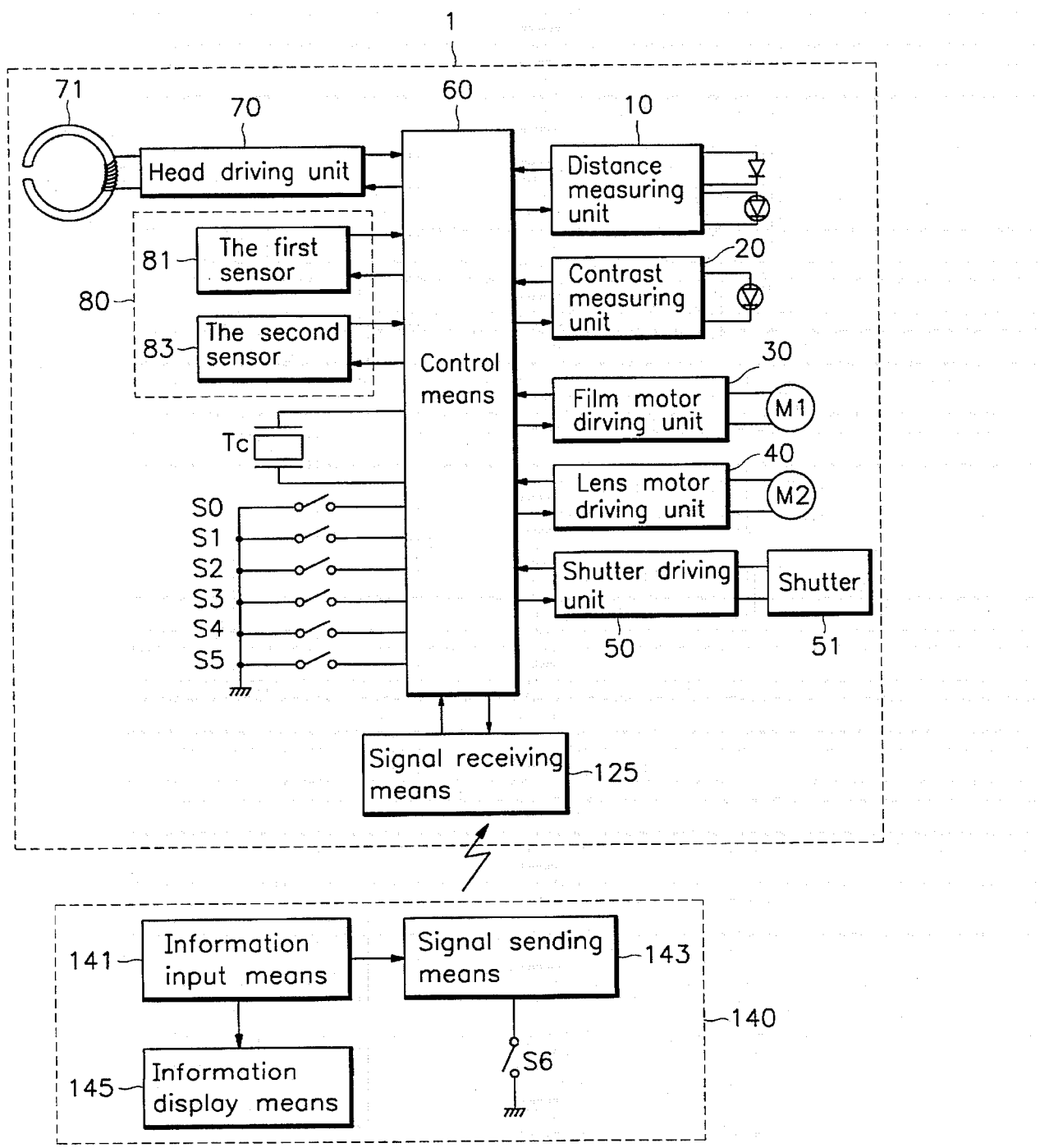
FIG. 10 is a functional block diagram of an APS camera according to a fourth embodiment of the present invention.

As shown in FIGS. 7-9, the information input means 110 may be a conventional personal computer 110, and a separate cable 122 may be used to connect the camera 1 to the personal computer 110. The processes of displaying, transmitting and recording the inputted information are the same for the third embodiment as described above for the first and second embodiments, and thus, will not be described in detail.

Finally, the fourth embodiment of the present invention will be described with reference to FIGS. 10-14. As shown in the block diagram of FIG. 10, the camera 1 consists of the same components as described for FIGS. 1 and 6. Therefore, a detailed explanation of these components will be omitted. As further shown in FIG. 10, the fourth embodiment differs from the previously described embodiments, since a remote control 140, having an information input means 141 and a remote signal sending means 143, is provided for inputting information to the camera 1. The camera 1 includes a signal receiving means 125 which is connected to the control means 60 of the camera 1. The remote control 140 preferably includes an information display means 145 for displaying the inputted information, and a switch S6 to start the transmission of the signals by the signal sending means 143. The signal receiving means 125 receives signals corresponding to the information to be recorded on the film.

Figure 12:
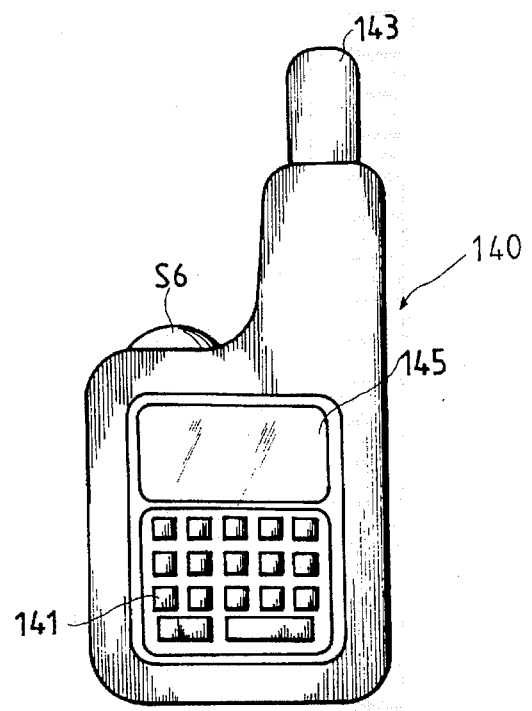
FIG. 12 is a detailed view of the remote control shown in FIG. 11.
Figure 13:
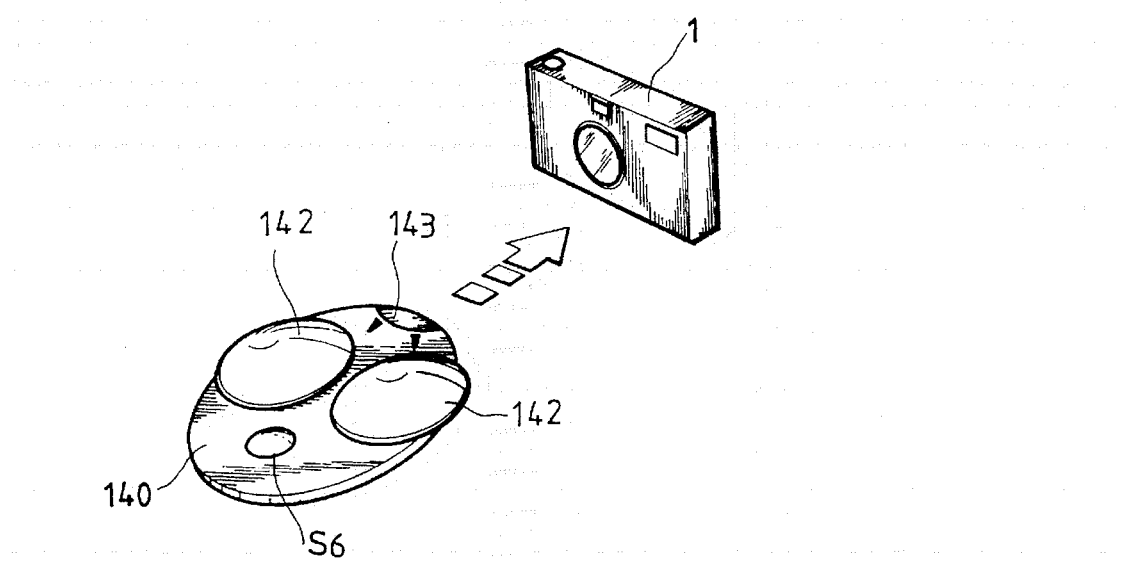
FIG. 13 shows a transmission of signals between another remote control and the APS camera according to the fourth embodiment of the present invention.
Figure 14:
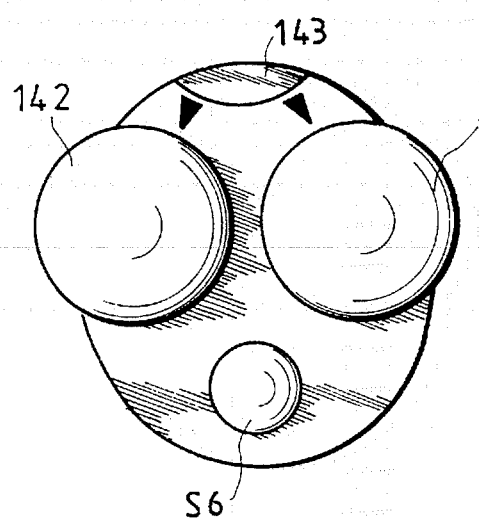
FIG. 14 is a detailed view of the remote control shown in FIG. 13.

The remote control 140 can have several configuration as shown in FIGS. 12-14. In the first configuration, as shown in FIG. 12, the remote control 140 includes a keyboard 141 for inputting the information that is to be recorded on the film, a liquid crystal display device 145 for displaying the information, a signal output switch S6 for initiating the sending of the signals, and a signal sending means 143 (for example, an infared transmitter) for sending the signals, representative of the inputted information, to the remote signal receiving means 125 of the camera 1. Thus, the information may be inputted with the keyboard 141 and confirmed with the liquid crystal display device 145. After inputting the information correctly, the switch S6 may be depressed to send the signals to camera 1. The signal receiving means 125 (for example, an infared receiver) receives the signals and outputs the signals to the control means 60. The control means 60 subsequently instructs the magnetic head 71 to record the inputted information on the magnetic track of the film.

The second configuration of the remote control 140 is shown in FIGS. 13 and 14. In this configuration, dials 142 are used as the information input means. To input desired information, the dials 142 are rotated to their desired positions, the switch S6 is depressed, and the signals corresponding to the information inputted by the dials 142 are transmitted to the control means 60 via the signal receiving means 125 of the camera 1 and the signal output means 143 of the remote control 140. In this configuration, the information display means is not required since the inputted information can be visually seen on the dials 142. The operation of the camera 1 of the fourth embodiment is same as previously described for the first, second and third embodiments, and thus, will be omitted.

Figure 15:
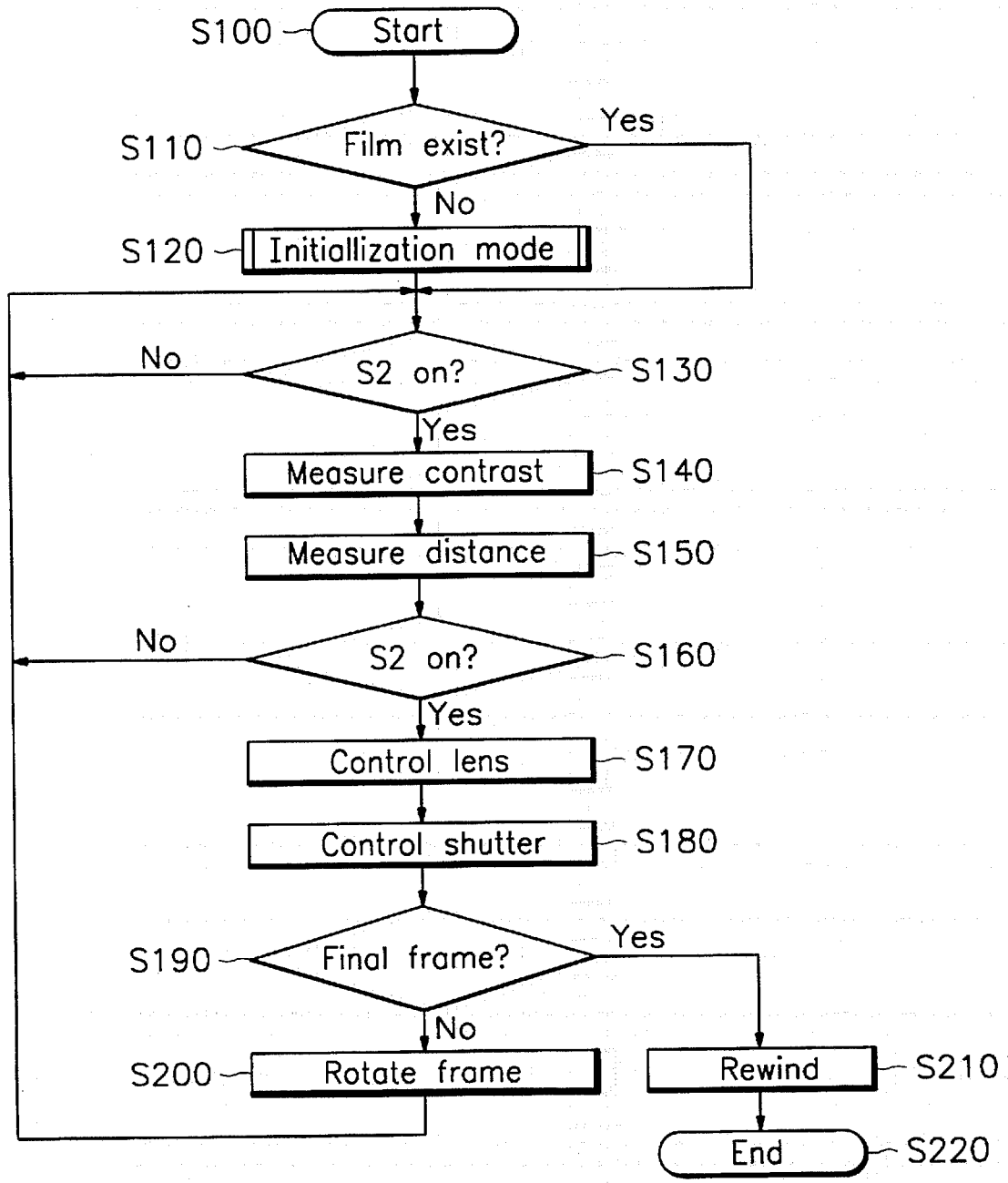
FIG. 15 is a flow chart which explains the operation of the control means of the APS cameras according to the first through fourth embodiments of the present invention.

The operation of the control means 60 of the camera 1 according to the previously- described embodiments of the present invention will now be described with reference to the flow chart of FIG. 15. As shown in FIG. 15, when a user turns on the power switch S1 of the camera 1, power is supplied to the camera 1, and the control means 60 initializes all the circuits in the camera 1, step S100, and determines whether the film is ready for photographing by detecting the condition of film detection switch S5, step S110. In initialization mode, step S120, when the film is not ready for photographing, the control means 60 rotates a film cartridge spool (not shown) of the camera 1. When the film is ready for photographing, the control means 60 determines the condition of the release switch S2, step S130.

When the release switch 52 is turned on, the control means 60 instructs the contrast measuring unit 20 to measure the contrast of the object, step S140, and instructs the distance measuring unit 10 to measure the distance from the camera 1 to the object, step S150. The control means 60 also adjusts the lens position, step S170, and the shutter speed, step S180, according to the measured contrast and distance. Furthermore, while exposing the film to the photographed object, the control means 60 outputs a signal to drive the head driving unit 70 to instruct the head driving unit 70 to cause a contact between the magnetic head 71 and the film and thus record the information on the magnetic track of the film. Finally, when the photographing switch SO is depressed, the object and the information are recorded on the photograph.

At step S190, the control means 60 determines whether the final frame has been exposed. If so, the film is rewound (S210) and the sequence ends (S220). If not, the film is advanced (S200) and the control returns to step S130.

By using the APS camera of the present invention, information may be recorded onto a film easily and conveniently. While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A camera for recording information on a magnetic track of a film, the camera comprising:

first information input means for inputting information and for generating signals representing said information, said first information input means being formed on an inner surface of a rear cover of said camera, wherein the rear cover is hingedly attached to a rear portion of a bottom edge of said camera;

information display means for displaying said information and being formed on a rear surface of said camera so that when the rear cover is opened, information can be inputted with said first information input means and viewed on said information display means; and control means for recording said information onto a magnetic track of a film, said control means being provided within a body of said camera, being electrically coupled to said first information input means to receive the information signals and being electrically coupled to said information display means to send the information signals thereto.

2. The camera according to claim 1, wherein said first information input means comprises a keyboard.

3. The camera according to claim 1, wherein said information display means comprises a liquid crystal display device.

4. The camera according to claim 1, further comprising:

an upper cover hingedly attached to the rear cover for covering an upper surface of said camera; and second information input means for inputting information and for generating signals representing said information, said second information input means being electrically coupled to said control means and being provided on an inner surface of a front cover of said camera, wherein the front cover is hingedly attached to said upper cover so to cover a front surface of said camera.

5. The camera according to claim 1, further comprising a second information for inputting information and for generating signals representing said information, said second information input means being electrically coupled to said control means and being provided on an inner surface of a front cover of said camera, wherein the front cover is hingedly attached to a front portion of the bottom edge of said camera.

6. The camera according to claim 4, wherein said second information input means comprises a keyboard.

7. A camera for recording information on a magnetic track of a film, the camera comprising:

a plurality of dials for inputting said information and for generating signals representing said information, said plurality of dials being provided on a rear surface of said camera;

information display means for displaying said information and being formed on an inner surface of a rear cover of said camera, the rear cover being hingedly attached to a bottom edge of said camera so that when the rear cover is opened, information can be inputted with said plurality of dials and viewed on said information display means; and control means for recording said information onto a magnetic track of a film, said control means being provided within a body of said camera, being electrically coupled to said plurality of dials to receive the information signals, and being electrically coupled to said information display means to send the information signals thereto.

* * * * *